April 16, 1968  G. DE COYE DE CASTELET  3,377,995

COMBUSTION CHAMBER FOR ROTARY PISTON ENGINE

Filed Oct. 7, 1965

Inventor
Gaetan De Coye De Castelet

Stevens, Davis, Miller & Mosher

Attorneys

United States Patent Office 3,377,995
Patented Apr. 16, 1968

3,377,995
COMBUSTION CHAMBER FOR ROTARY
PISTON ENGINE
Gaëtan de Coye de Castelet, Billancourt, France, assignor to Regie Nationale des Usines Renault, Billancourt, France
Filed Oct. 7, 1965, Ser. No. 493,679
Claims priority, application France, Mar. 26, 1965, 10,923, Patent 1,437,693
11 Claims. (Cl. 123—8)

ABSTRACT OF THE DISCLOSURE

In a rotary engine having a rotor of N lobes of epicycloidal profile rotating eccentrically in a stator of $N+1$ lobes of matching profile and forming $N+1$ variable volume working chambers with which combustion chambers are associated, zones of the working chambers adjacent the combustion chambers including means to prevent disadvantageous combustion in these zones.

The invention relates to rotary piston engines of the type wherein a rotor having N lobes of epicycloidal profile rotates eccentrically in a stator having $N+1$ lobes, the profile of which is an envelope curve conjugate with the epicycloid of the rotor and consequently forming $N+1$ working chambers of variable volume.

When the rotor comes into the vicinity of the upper dead center, the working chamber is, in cross-sectional view, in the approximate shape of a crescent the ends of which are thin and constitute thin "slits" in which it is found that, at the time of explosion, complex phenomena occur which are very unfavorable to combustion, more particularly a rush of gas causing exceptional agitation, detonation phenomena and local overheating.

It is not possible to eliminate these slits, the existence of which is due to the fact that the curve of the stator is not that of the rotor but the envelope thereof, the interval between the two curves being moreover supplemented by a certain clearance which is required for expansion.

Therefore, the object of the present invention is to neutralize or isolate the slits at the moment of explosion so that the phenomena mentioned hereinbefore are eliminated or at least reduced to acceptable limits.

For this purpose it is proposed to provide in the wall of the stator, in the zones of the working chambers which are adjacent the combustion chambers, recesses of small volume constituting expansion chambers for the gases or to arrange in the wall, on either side of the combustion chambers, projecting elements, segments or small bars isolating the slits from the combustion chambers at the moment of explosion.

Various forms of embodiment of the invention will now be described by way of non-limiting examples with reference to the accompanying drawings wherein.

Figure 1:
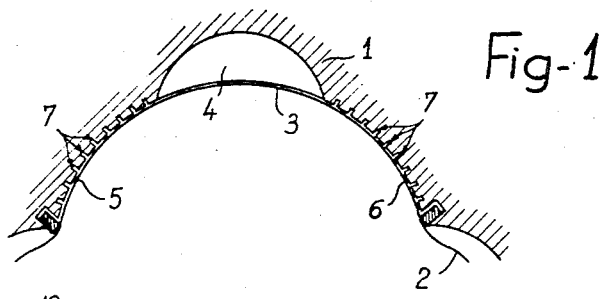
FIGURE 1 is a partial cross-sectional view of an engine head provided with expansion grooves.

FIGURE 1 shows a first form of embodiment of the invention. 1 is the stator and 2 indicates the rotor when it is near its upper dead center position and the cross-section of the working chamber 3 is then in the form of a very elongated crescent. It will be appreciated that on either side of the combustion chamber 4 there exist zones in the form of slits 5 and 6 in which phenomena very disadvantageous to combustion occur at the time of explosion.

According to one form of embodiment of the invention, there is formed in the surface of the engine head, that is to say in the wall of the stator, on either side of the combustion chamber 4, consequently in the slits 5 and 6 parallel to the axis of the engine, recesses of small volume, represented here in the form of grooves 7, the dimensions of the grooves and the spacing thereof, which may or may not be uniform, being dependent on the dimensions of the engine.

These grooves form expansion chambers for the gases and by considerably increasing the surface at which the gases contact the mass of the stator to thereby, cool the gases sufficiently to obviate detonation.

Of course, the recesses could be given any other form than that of grooves, more particularly these recesses could be oblong depressions formed at the time of casting in the head wall, or even cylindrical blind holes.

It will also be noted that if the combustion chamber does not occupy the entire width between the two lateral bearing plates of the stator, the grooves or in a wider sense recesses may be provided also on each side of the chamber in the circumferential sense i.e. perpendicularly to the grooves 7.

Figures 2, 3:
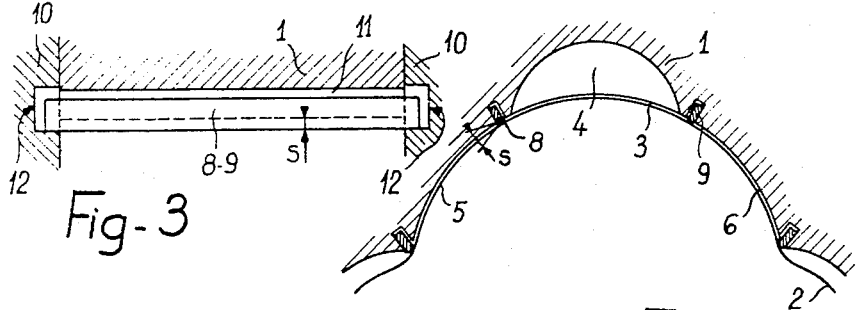
FIGURE 2 is a partial cross-sectional view of an engine head provided on either side of the combustion chamber with arresting segments.
FIGURE 3 shows in longitudinal sectional view a method of securing these arresting segments.

A second arrangement according to the invention is shown in FIGURE 2. This consists in isolating the slits by means of segments which will be referred to hereinafter as arresting segments, and are situated on either side of the combustion chamber 4. These segments 8 and 9 have a securing device such that their projection S relatively to the wall of the stator cannot exceed a certain value corresponding to the interval which separates the stator and the rotor when the latter is at about $\pm 20°$ from the upper dead center. By way of example, the segment can be secured as shown in FIGURE 3. Here, 1 is the central portion of the stator and 10 the two lateral bearing plates of the stator in which are formed, opposite the groove 11 of the segment, blind holes 12 in which this segment engages at its ends and which therefore retain the segment in such a manner that the maximum projection S does not exceed the desired value.

Of course, each segment is urged in the direction of the rotor in the usual way by springs (not shown) and also by the pressure of gases which terminate in the groove in which it is housed.

It will be seen that at the moment of explosion the segments 8 and 9 isolate the slits 5 and 6 and consequently prevent the disturbing phenomena from occurring in these zones.

When the rotor has turned sufficiently to eliminate contact between rotor and segments, the slits 5 and 6 will have reached a very substantially greater thickness than at the moment of explosion, and combustion can progress therein normally.

Figure 4:
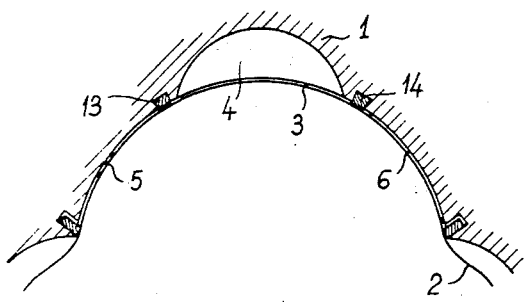
FIGURE 4 is a partial cross-sectional view of an engine head provided on either side of the combustion chamber with fixed barriers in the form of fitted-on bars.

FIGURE 4 shows a third embodiment of the invention. It consists in replacing the arresting segments of FIGURE 2 by fixed barriers which are here in the form of small fitted-on bars 13 and 14 which project relatively to the surface of the stator, the projection being greater by several tenths of a millimeter than the interval which separates the rotor and stator when they are nearest to one another i.e. at the upper dead center.

These bars are made of a relatively soft friction metal and their frictional contact surface is serrated in such a manner that the projecting edges can easily be worn down in contact with the rotor during a first grinding-in period.

The projection of the bars is rapidly reduced to that which corresponds to the maximum approach of the rotor and stator to one another under normal conditions of use. Thus, it will be appreciated when explosion occurs the bars 13 and 14 isolate the slits 5 and 6 in the same way as the segments 8 and 9 in the previous embodiment.

Figure 5:
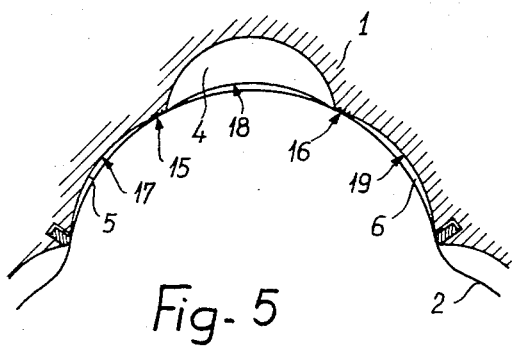
FIGURE 5 is a modified form of the embodiment of FIGURE 4 comprising barriers formed in the stator body by machining.

It is also possible to envisage forming the fixed bars from the stator body itself by machining, as FIGURE 5 shows.

The projecting portions 15 and 16 which remain between the surface machined in the form of arcs of circles 17, 18 and 19 fulfil exactly the same purpose as the fixed bars 13 and 14 in the previous arrangement.

Of course the arrangements shown in FIGURES 2, 4 and 5 may each be combined with the arrangement shown in FIGURE 1 or with any other equivalent arrangement and it is also possible to provide a plurality of segments or bars side by side.

I claim:

1. An improvement in rotary internal combustion engines having a rotor with N lobes of epicycloidal profile rotating eccentrically in a stator having $N+1$ lobes of matching profile forming $N+1$ variably volume working chambers each of which includes a combustion chamber, said improvement comprising means in said stator immediately adjacent said combuston chamber, in the direction of rotation of said rotor, for abruptly cutting off the crescent shaped end portions of said working chamber formed when the volume of said working chamber is reduced to a minimum at the moment of combustion thereby preventing unwanted combustion in said crescent shaped end portions.

2. A rotary internal combustion engine according to claim 1 wherein said means comprises a plurality of recesses of small volume formed in the stator wall and constituting expansion chambers for the gases.

3. A rotary internal combustion engine according to claim 2, wherein said recesses are constituted by grooves which are parallel to the axis of the engine and are formed in the wall of each working chamber on either side of the combustion chamber.

4. A rotary internal combustion engine according to claim 3 wherein said recesses further comprise circumferential grooves directed parallel to the transverse plane of the engine and formed on each side of the combustion chamber.

5. A rotary internal combustion engine according to claim 2 wherein the recesses are constituted by blind holes.

6. A rotary internal combustion engine according to claim 1 wherein said means comprise a plurality of barrier means projecting from the stator wall and isolating, at the moment of explosion, the slit-shaped portions of the working chambers.

7. A rotary internal combustion engine according to claim 6 wherein said barrier means are formed by segments which are directed in the axial direction of the engine and are arranged in grooves formed in the stator on either side of each of the combustion chambers, said segments including means to secure said segments in said grooves, the maximum projection of said segments relative to the wall of the stator corresponding to the interval which separates said stator from the rotor when the latter is a about ±20° from the upper dead center.

8. A rotary internal combustion engine according to claim 6 wherein the barrier means are formed by bars which are fixedly mounted and arranged in the axial direction of the engine on either side of each of the combustion chambers.

9. A rotary internal combustion engine according to claim 8 wherein the bars project a distance greater by several tenths of a millimeter than the interval which separates the rotor from the stator when they are at the upper dead center, said bars being made of soft metal with the inwardly directed end being serrated so that the edges thereof can easily be worn down during engine break-in whereby the projection of the bar is rapidly reduced to that which corresponds to the maximum closeness of the rotor and stator under normal conditions of use.

10. A rotary internal cimbustion engine according to claim 6, wherein the barriers are formed from the body of the stator itself.

11. A rotary internal combustion engine according to claim 3 wherein said recesses are uniformly spaced.

References Cited

UNITED STATES PATENTS 3,286,698  11/1966  Peras _____ 123—8

RALPH D. BLAKESLEE, *Primary Examiner.*

MARK NEWMAN, *Examiner.*